Patented Apr. 25, 1939

2,156,070

UNITED STATES PATENT OFFICE 2,156,070

SEPARATION OF TERTIARY OLEFINS FROM GAS MIXTURES

Georg Stern, Neckargemund, and Wilhelm Friedrichsen, Ludwigshafen-on-the-Rhine, Germany, assignors to I. G. Farbenindustrie Aktiengesellschaft, Frankfort-on-the-Main, Germany No Drawing. Application July 10, 1937, Serial No. 153,004. In Germany July 18, 1936

5 Claims. (Cl. 260—663)

The present invention relates to the separation of tertiary olefins from gas mixtures containing the same.

We have found that tertiary olefins can be separated in a specially advantageous manner from industrial gas mixtures, in particular mixtures of hydrocarbons, by treating the gas mixtures at temperatures between about 50° and about 120° C. in the gaseous phase with a gaseous hydrogen halide in the presence of a solid halide of magnesium or barium. In this way the tertiary olefins are converted into the corresponding tertiary alkyl halides which may be separated in any suitable way from the other unconverted gases or vapors.

As tertiary olefins are intended those hydrocarbons which can be considered as being formed by splitting off water from tertiary alcohols. As examples there may be mentioned isobutylene, trimethylethylene, asymmetric ethyl-methyl-ethylene and their homologues, which are usually contained in industrial gas mixtures in small amounts together with other olefins and with saturated hydrocarbons. In particular, tertiary olefins are found in the mixtures of gases or vapors obtained by cracking hydrocarbons and also of certain natural gases. Tertiary olefins are also frequently contained in the gas mixtures obtained by the interaction of carbon monoxide and hydrogen.

Even when the tertiary olefins are present in the said hydrocarbon mixtures only in small amounts, their conversion into alkyl halides takes place without the other olefins reacting to any appreciable extent with the hydrogen halide. From the mixtures obtained according to this invention, the tertiary alkyl halides may be readily separated, even when the unconverted hydrocarbons are present in great excess, especially when hydrocarbon mixtures having a narrow boiling range have been used as initial materials, as for example mixtures consisting mainly of butylenes and butanes, or amylenes and pentanes, or hexylenes and hexanes. The separation of the tertiary alkyl halides may be effected for example by washing the reaction mixture with aromatic hydrocarbons of high boiling point, recovering the alkyl halides by fractional distillation and using the aromatic hydrocarbons again as washing liquid. The reaction mixture itself may also be condensed and then subjected to a fractional distillation, the alkyl halides thus being recovered.

The tertiary alkyl halides may be used as such for a great variety of industrial purposes; they may also be converted into tertiary alcohols or reconverted into tertiary olefins. This may be effected directly by catalytic splitting off of hydrogen halide with water and splitting off water from the resulting tertiary alcohol, as for example by leading the alcohol over anhydrous oxalic acid at elevated temperature. The hydrogen halide formed during the preparation of the olefins from the alkyl halides is preferably used again for separating the tertiary olefins from the gas mixtures.

The reaction is usually carried out by leading the hydrocarbon mixture together with the hydrogen halide (preferably employed in an excess of about 10 per cent with reference to the tertiary olefins) through a tube in which is arranged the barium or magnesium halide or a mixture of the same, advantageously in a porous form or distributed on a carrier. The reaction may also be carried out under pressure, and if desired continuously. If hydrogen chloride is used as the hydrogen halide for the separation of the tertiary olefins, then for example barium bromide or magnesium bromide is converted earlier or later in the course of the reaction into the corresponding chloride by reaction with the hydrogen chloride. It is preferable therefore to use from the start halides of barium or magnesium in which the acid radicle corresponds to the halogen in the hydrogen halide employed.

The process according to this invention renders it possible to separate from industrial gas mixtures in a simple manner the tertiary olefins which are becoming more and more important as initial materials for a great many branches of industrial chemistry. It even works satisfactorily when, for example, in a butylene mixture the butene-1 and butene-2 are present in an excess of ten times over the isobutylene. Other catalysts, as for example the chlorides of calcium, strontium or zinc already proposed for similar purposes, cause the reaction of only a part of the isobutylene under the same conditions and are therefore only of slight industrial value.

The following examples will further illustrate the nature of this invention but the invention is not restricted to these examples. The parts are by weight.

Example 1

880 grams (about 400 liters) of a mixture consisting of 91.5 per cent of butene-2 and 8.5 per cent of isobutylene are mixed with 52.5 grams (about 36 liters) of hydrogen chloride and led in a uniform stream at 95° C. during the course of about 5 hours through a glass or porcelain tube over 1.5 liters of a porous barium chloride catalyst which has been prepared as follows:

A mixture of equal parts of crystallized barium chloride and water is dried while heating by means of a powerful current of air to form a vesicular mass. The latter is broken up into pieces of about the size of peas and the water is completely expelled in a current of hydrogen chloride at from 150° to 200° C.

From the resulting reaction mixture, the tertiary butyl chloride is separated from the butene-2 by washing with aromatic hydrocarbons of high boiling point, as for example a pseudo cumol fraction. 115 grams (92 per cent of the calculated yield) of tertiary butyl chloride are obtained from the pseudo-cumol solution by expelling it. It contains at the most up to 2 per cent of normal butyl chloride.

If the mixture of olefins and hyrdogen chloride be led at 95° C. under the same reaction conditions over a catalyst prepared in a corresponding manner from magnesium chloride, a tertiary butyl chloride of the same purity is obtained in a yield of 78 per cent.

If the mixture of olefins is passed at about 65° C. under the same conditions together with 1600 grams of hydrogen bromide per kilogram of the said mixture over a porous barium chloride catalyst prepared as described above, a very pure tertiary butyl bromide is obtained in a yield of 72 per cent. With barium bromide prepared in a similar manner tertiary butyl bromide of the same purity is obtained in a yield of 92 per cent.

*Example 2*

A pentene fraction containing 10 per cent of trimethylethylene in addition to a large amount of isopropylethylene, the said fraction having been obtained from an olefin mixture prepared from carbon monoxide and hydrogen under pressure, is mixed per each kilogram with about 550 grams of hydrogen chloride and led over a barium chloride catalyst at 95° C. in the manner described in Example 1. By distilling the washing liquid, 95 per cent of the trimethylethylene are recovered as the tertiary chloride.

What we claim is:

1. A process for the separation of tertiary olefins from gas mixtures containing the same which comprises treating such mixtures with a gaseous hydrogen halide at a temperature between about 50° and about 120° C. and in the presence of a solid halide of a metal selected from the group of barium and magnesium, the tertiary olefins thereby being converted into the corresponding tertiary alkyl halides, and then removing the latter from the remaining gas mixture.

2. In the process as claimed in claim 1 employing a solid halide in which the acid radicle corresponds to the halogen in the hydrogen halide.

3. A process as claimed in claim 1, in which the halides are chlorides.

4. A process as claimed in claim 1, in which the halides are bromides.

5. A process as claimed in claim 1, in which the hydrogen halide is employed in an excess of about 10 per cent with reference to the tertiary olefins.

GEORG STERN.
WILHELM FRIEDRICHSEN.